United States Patent [19]

Davis, Jr. et al.

[11] 4,040,961
[45] Aug. 9, 1977

[54] SEPARATION OF SOLIDS FROM A LIQUID

[75] Inventors: Rufus F. Davis, Jr., Kenwood, Ky.; Donald G. Marting, Murray Hill, N.J.

[73] Assignee: Coaltek Associates, Morristown, N.J.

[21] Appl. No.: 590,751

[22] Filed: June 26, 1975

[51] Int. Cl.² .......................................... B01D 21/10
[52] U.S. Cl. .......................... 210/195 R; 202/262; 209/173; 209/10; 210/307; 210/513; 210/522; 210/536
[58] Field of Search .............. 210/83, 195 R, 513, 210/307, 511, 515, 521, 522, 534, 532, 535, 536, 537; 209/173, 156, 157, 172, 172.5, 164, 165; 201/29; 202/241, 262

[56] References Cited

U.S. PATENT DOCUMENTS

| 1,198,759 | 9/1916 | Pinder et al. | 210/534 X |
|---|---|---|---|
| 2,088,624 | 8/1937 | Tschudy | 209/164 |
| 2,530,676 | 11/1950 | Berg et al. | 209/173 |
| 3,307,790 | 3/1967 | Cohen et al. | 209/168 X |
| 3,367,495 | 2/1968 | Lea et al. | 209/156 X |
| 3,722,678 | 3/1973 | Potter | 209/156 |
| 3,804,721 | 4/1974 | Gidick | 202/256 |
| 3,864,251 | 2/1975 | Cymbalisty | 210/83 X |
| 3,962,098 | 6/1976 | Sze | 210/513 X |

FOREIGN PATENT DOCUMENTS

| 857,778 | 9/1940 | France | 210/535 |
| 294,541 | 6/1915 | Germany | 210/534 |

OTHER PUBLICATIONS

"Coal, Coke and Coal Chemicals" by P. J. Wilson, McGraw-Hill Book Co., Inc., 1950, pp. 240-245.
Chemical Engineers' Handbook, J. Perry, Editor, pub. by McGraw-Hill Book Co., Inc., 1963, pp. 21-52—2-1-63.

Primary Examiner—Frank W. Lutter
Assistant Examiner—N. Greenblum
Attorney, Agent, or Firm—Gerard P. Rooney

[57] ABSTRACT

The invention is an apparatus and method for separating solid particles from a liquid, including both light particles which tend to flow on or close to the surface of the liquid and heavy particles which tend to sink to the bottom of the liquid. The apparatus includes: a separation tank, an inlet means, a weir, a heavy particle outlet means, and a substantially clear liquid outlet means. The method includes: flowing the liquid containing suspended solid particles into the separation tank; adjusting the flow rate to said tank to allow a residence time for the liquid in the separation tank sufficient for the light particles to float toward the surface of the liquid and for the heavy particles to sink toward the bottom of the liquid in the separation tank; passing the light particles at or near the surface of the liquid across the weir; allowing the heavy particles in the liquid to settle to the bottom, removing heavy particles from the bottom of the separation tank; and removing substantially clear liquid from an intermediate elevation of the liquid in the separator tank. In a preferred embodiment, the invention is used in conjunction with the operation of a coke oven battery to recover fine coal particles and agglomerates in a flushing liquor leaving a charging main so that such recovered fine coal particles and agglomerates may be recycled through a coke oven for conversion into coke; and to recover substantially clear flushing liquor for reuse.

8 Claims, 7 Drawing Figures

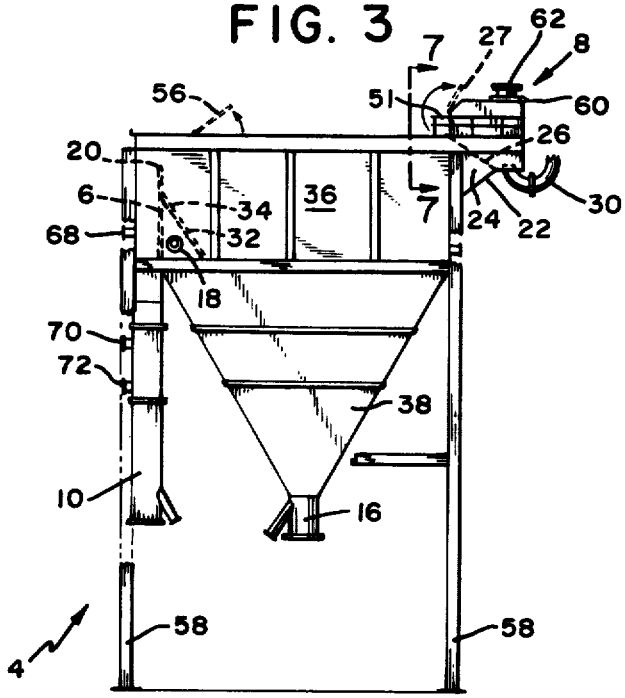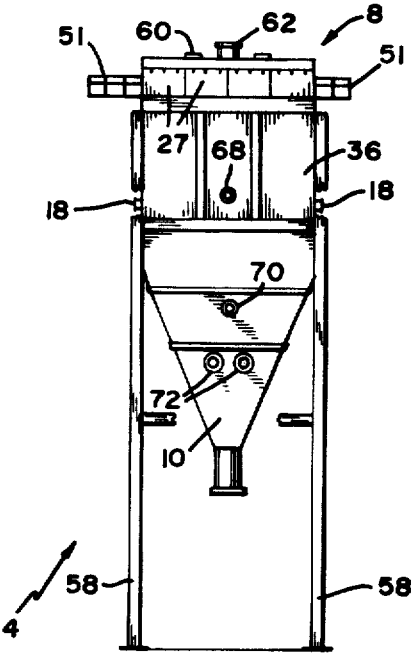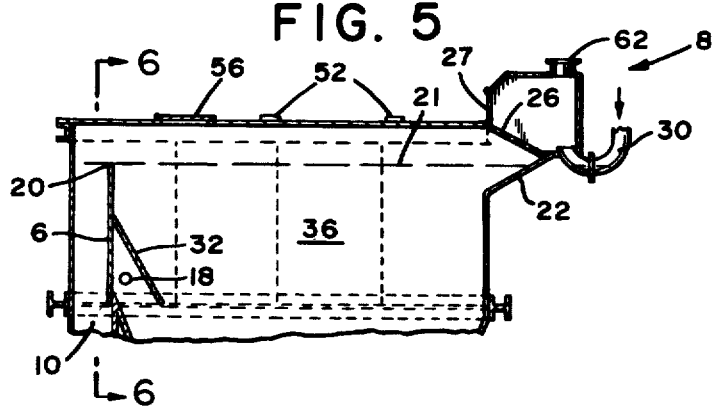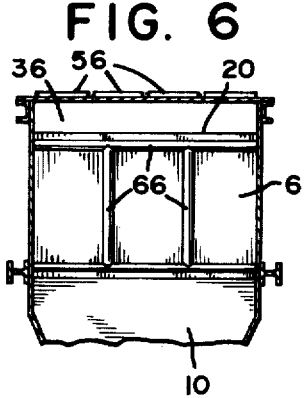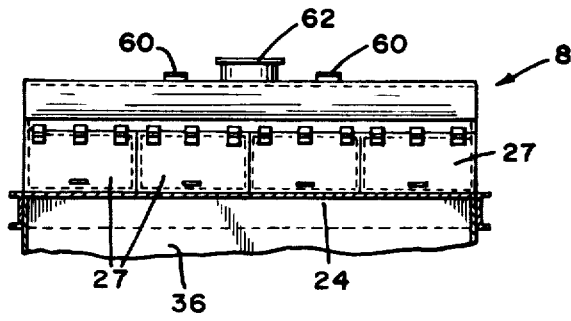

SEPARATION OF SOLIDS FROM A LIQUID

BACKGROUND OF THE INVENTION

The invention relates to an apparatus and method for separating solid particles from a liquid. An example of a use for the apparatus and method of this invention is during the production of coke from coal, such as in by-product coke ovens. In this example, the invention is used for the separation of fine coal particles and agglomerates from flushing liquor from a charging main on a coke oven battery.

There are many situations, especially in industry, where solid particles need to be removed from a liquid. These situations include removal of comparatively light particles which tend to float at or close to the surface of the liquid and removal of comparatively heavy particles which tend to sink to the bottom of a liquid in an enclosure. Prior art clarifiers and classifiers are disclosed in Chemical Engineer's Handbook, edited by Perry, Chilton and Kirkpatrick, published by McGraw Hill Book Co., Inc., New York, 1963, page 21-52 to page 21-63. In by-product coke ovens the use of a flushing liquor to treat gases in a charging main is a comparatively new development in coke oven operation and should be distinguished from the use of a flushing liquor to treat gases in a collecting main. Treatment of gases in a charging main is performed to remove fine coal particles and agglomerates which are carried over with the gases emanating during the charging operation prior to coking and the very early stages during the coking cycle, e.g. 1-2 hours. Treatment of by-product gases in a collecting main is performed to remove tar and other by-product constituents during essentially the entire coking operation. The treatment of gases in a collecting main and treatment of flushing liquor from the collecting main is described in "Coal, Coke and Coal Chemicals" by Philip J. Wilson, Jr. and Joseph H. Wells, published by McGraw-Hill Book Company, Inc., 1950, pages 240-245. Prior art methods and apparatus for the treatment of the flushing liquor from the collector main include flowing the flushing liquor into a decanter, over a fixed weir, then to a collector tank, as described in "Coal, Coke and Coal Chemicals", pages 244-245. Such a decanter operates to remove tar after coking, rather than removing fine coal particles and agglomerates before coking. U.S. Pat. No. 3,804,721 to W. F. Gidick briefly refers to treating dirty liquor to remove coal particles.

SUMMARY OF THE INVENTION

The generic invention is an apparatus and method for separating solid particles of different physical characteristics suspended in a liquid. The solid particles include both light particles which tend to flow on or close to the surface of the liquid and heavy particles which tend to sink to the bottom of the liquid. The separation apparatus includes: a separation tank, inlet means a light particle outlet, a heavy particle outlet means, and a substantially clear liquid outlet means.

The separation tank receives the liquid and solid particles. The inlet means is for conducting the liquid and suspended solid particles into the separation tank. The light particle outlet in the form of a weir is disposed in the separation tank. The weir has an upper edge. The upper edge is arranged at an elevation in the separation tank which is slightly lower than a normal level of the liquid in the separation tank. The light particles at or close to the surface of the liquid flow over the weir and out of the separation tank. This flow over the weir accomplishes separation of the light particles in the form of a light particle slurry which contains a higher concentration of light particles per volume of liquid in the light particle slurry after flow over the weir than the concentration previously present in the liquid entering the separation tank before flow over the weir.

The heavy particle outlet means is disposed at the bottom of the separation tank. The heavy particle outlet means conducts the heavy particles in the liquid out of the separation tank in the form of a heavy particle slurry which contains a comparatively higher concentration of heavy particles per volume of liquid in the heavy particle slurry than the concentration of heavy particles previously present in the liquid entering the separation tank. The liquid at an intermediate elevation of the liquid in the separation tank becomes substantially clear, as a result of the floating of light particles toward the surface of the liquid and the result of the sinking of heavy particles toward the liquid in the separation tank. The substantially liquid clear outlet means conducts substantially clear liquid out of the separation tank.

The method of the present invention includes: flowing the liquid containing suspended solid particles into the separation tank; adjusting the flow rate of the liquid to the separation tank to allow a residence time for the liquid and solid particles in the separation tank sufficient for substantially all light particles to float toward the surface of the liquid and sufficient for substantially all heavy particles to sink toward the bottom of the liquid in the separation tank; flowing the light particles which float at or near the surface of the liquid across the weir in the form of a light particle slurry; allowing the heavy particles in the liquid to settle to the bottom of the separator tank; removing substantially clear liquid from an intermediate elevation of the liquid in the separator tank; and removing heavy particles from the bottom of the separation tank in the form of a heavy particle slurry. The liquid at an intermediate elevation of the liquid in the separation tank becomes substantially clear as a result of the floating of the light particles toward the surface of the liquid and as a result of the sinking of the heavy particles toward the bottom of the liquid in the separation tank.

In a preferred embodiment of the present invention, the apparatus and method is used in conjunction with the operation of a coke oven battery in which coal is converted to coke. In such a preferred embodiment, the liquid is a flushing liquor used in the charging main for treating gases from the coke ovens. The solid particles are suspended in the flushing liquor as the flushing liquor leaves the charging main of a coke oven battery. The light particles in the flushing liquor leaving the charging main are fine coal particles which tend to float at or close to the surface of the flushing liquor. The heavy coal particles in the flushing liquor leaving the charging main are agglomerates which tend to sink to the bottom of the liquid. In such preferred embodiment, a primary object of the present invention is to recover fine coal particles and agglomerates from the flushing liquor leaving the charging main so that such recovered fine coal particles and agglomerates may be recovered and, if desired, be recycled to a coke oven for conversion into coke. In such preferred embodiment, a secondary object is to recover substantially clear flushing liquor by removing the fine coal particles and agglomerates so that the recovered substantially clear flushing liquor may be recycled to the charging mains for reuse. The present invention provides a simplified apparatus and method for separating solid particles, including light particles which tend to float and heavy particles which tend to sink, without the use of mechanical devices, relying instead on an arrangement of flow rates.

DESCRIPTION OF THE DRAWING

FIG. 3 is a side elevational view of FIG. 2 in the direction indicated by arrow A in FIG. 2.

FIG. 4 is a side elevational view of FIG. 2 in the direction indicated by arrow B in FIG. 2.

FIG. 5 is a longitudinal section of FIG. 2 along the lines 5—5 in FIG. 2.

FIG. 6 is a longitudinal section of FIG. 5 along the lines 6—6 in FIG. 2.

FIG. 7 is a longitudinal section of a portion of FIG. 3 along the lines 7—7 in FIG. 3, showing an inlet box.

DETAILED DESCRIPTION OF THE PREFERRED EMBODIMENT

The generic invention for separating solid particles from a liquid may be used in a wide variety of applications, both in industry and on a laboratory scale. In a preferred embodiment, the method and apparatus of the present invention are used in conjunction with a coke oven battery of a coke plant, such as a by-product coke plant, in which coal is converted to coke. The liquid is flushing liquor from a charging main of the coke oven battery. The light particles are fine coal particles suspended in the flushing liquor. The heavy particles are agglomerates suspended in the flushing liquor.

Figure 1:
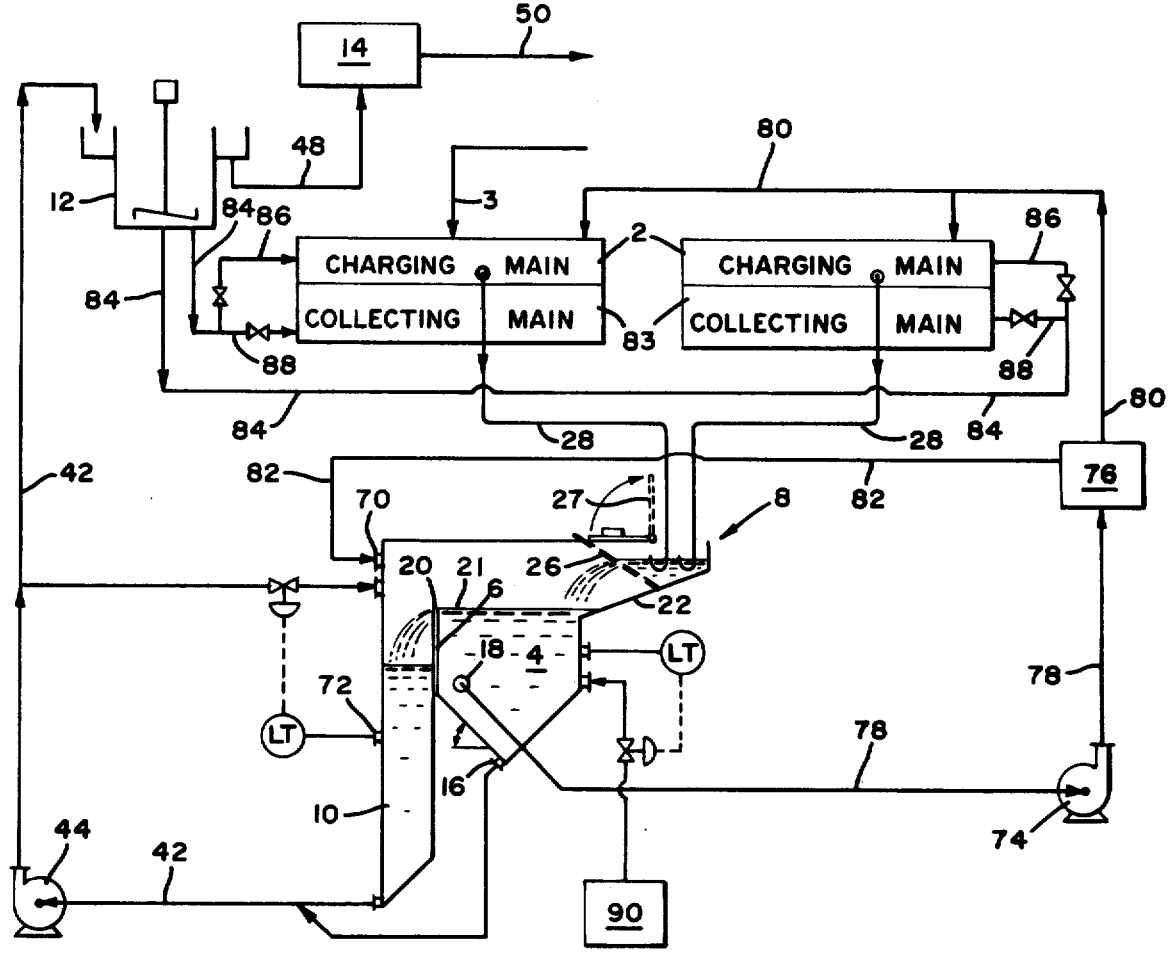
FIG. 1 is a schematic illustration of a fine coal recovery system in which the apparatus and method of the present invention are used.

Referring to FIG. 1, the apparatus and method of the present invention is used for the separation of fine coal particles and agglomerates from flushing liquor emanating from two charging mains 2, each serving a coke oven battery. In the preferred embodiment, the invention is sometimes referred to as a "Fine Coal Recovery System" or a "Coal Fine Recovery System" because the fine coal particles removed from the flushing liquor may be recycled to the coke ovens. The invention may be used to recover coal particles and agglomerates from a flushing liquor regardless of how the coal is charged into the coke ovens, including conventional charging of wet coal by a coal charging car or charging of preheated coal into the coke ovens either by a coal charging car, a pipeline charging system or by some other delivery means to a coke oven.

The flushing liquor emanating from the charging main 2 contains solid particles suspended therein. The solid particles are carried by hot air, steam and gas from coke ovens through a gas conduit means 3 into the charging means 2. A typical distribution of solid particles carried into the charging main 2 and picked up by the flushing liquor is shown by the following table.

| U.S. Standard Sieve Number | Percentage Retention of Coal Particles | Percentage Retention of Agglomerates |
|---|---|---|
| 8 | 0% | 10% |
| 12 | 1 | 20 |
| 40 | 9 | 60 |
| 60 | 15 | 75 |
| 100 | 23 | 90 |
| 200 | 43 | 95 |

The foregoing table illustrates a cumulative percentage of retention of solid particles for a given sieve number. The coal has a specific gravity of 1.2 to 1.5. Such particles were previously picked up by the flushing liquor when the flushing liquor was sprayed into the charging main 2 for the purpose of treating gases in the charging main 2. The solid particles suspended in the flushing liquor include both fine coal particles and agglomerates. The fine coal particles are light in weight and tend to float at or close to the surface of the flushing liquor. The agglomerates are particles which are heavy in weight and tend to sink to the bottom of the flushing liquor. The agglomerates include tar agglomerates, coal agglomerates and a combination of tar and coal agglomerates. The gases from which the solid particles are removed may be used to dry or pre-heat coal which is subsequently supplied to the coke ovens.

METHOD

Referring to FIGS. 1-5, the separation method includes: flowing flushing liquor containing suspended fine coal particles and agglomerates from the charging main 2 of a coke oven battery into a separation tank 4; adjusting the flow rate of the flushing liquor into the separation tank 4 to allow a residence time for the flushing liquor and suspended particles in the separation tank 4 sufficient for substantially all light fine coal particles to float toward the surface of the flushing liquor in the separation tank 4 and sufficient for substantially all heavy agglomerate particles to sink toward the bottom of the flushing liquor in the separation tank 4; passing the fine coal particles which float at or near the surface of the flushing liquor in the separation tank 4 across a weir 6 (FIGS. 1, 3 and 5); allowing the heavy agglomerates in the flushing liquor in the separation tank 4 to settle to the bottom of the flushing liquor in the separation tank 4; removing substantially clear flushing liquor from an intermediate elevation of said flushing liquor in said separation tank 4 via a flushing liquor outlet means 18; and removing the heavy agglomerates from the bottom of the separation tank 4 via an agglomerate outlet means 16.

The step of flowing the fine coal particles across the weir 6 results in the separation of the fine coal particles in the form of a fine coal slurry which contains a higher concentration of fine coal particles per volume of flushing liquor in the fine coal slurry than the concentration of fine coal particles per volume of flushing liquor previously present in the flushing liquor emanating from the charging main 2 and in the flushing liquor entering the separation tank 4. The step of removing the agglomerates from the bottom of the separation tank 4 results in the separation of agglomerates in the form of an agglomerate slurry which contains a comparatively higher concentration of agglomerates per volume of liquid in the agglomerate slurry than the concentration of agglomerates previously present in the flushing liquor emanating from the charging main 2 and in the flushing liquor entering the separation tank 4.

The method further includes: conducting the flushing liquor containing suspended fine coal particles and agglomerates from the charging main 2 to an inlet means, such as an inlet tank 8, prior to conducting the flushing liquor, fine coal particles and agglomerates into the separation tank 4; and conducting substantially clear flushing liquor from the separation tank 4 to the charging main 2 via conduit means 42, such as pipelines, for reuse in treating gases in the charging main 2.

The method further includes separating fine coal particles from the fine coal particle slurry, separating the agglomerates from the agglomerate slurry and recycling such fine coal particles and agglomerates to the coke oven battery. The step of separating the fine coal particles from the fine coal slurry, separating the agglomerates from the agglomerate slurry and the step of recycling the fine coal particles and agglomerates to a coke oven battery includes: conducting the fine coal particle slurry containing fine coal particles from the separation tank 4 to a downcomer pipe 10; conducting the fine coal slurry containing fine coal particles from the downcomer pipe 10 and the agglomerate slurry via the same conduit means 42, such as a pipeline, to a flotation cell means 12 wherein the fine coal particles and agglomerates are further concentrated from the fine coal and agglomerate slurry into a fine coal and agglomerate froth having a concentration, for example, of 10% by weight of solid particles; conducting the fine coal and agglomerate froth from the flotation cell means 12 via a froth conducting means 48, such as a pipeline, to a filter means 14 wherein the fine coal and agglomerates are separated from the froth; and recovering the fine coal from the filter means 14. The fine coal and agglomerates from the filter means 14 are in the form of a "filter cake" having a concentration, for example, of about 50% by weight of solid particles. These fine coal particles and agglomerates may be conveyed via line 50 either to a storage pile, or a preheater to preheat these coal particles for ultimate introduction into a coke oven battery.

The method further includes: conducting the substantially clear flushing liquor from the outlet means 18 in the separation tank 4 to the charging main 2 for reuse in treating gases in the charging main 2. The method also includes: maintaining a pressure seal as the flushing liquor containing the suspended solid particles is conducted into the inlet tank 8 and into the separation tank 4, and aerating the flushing liquor containing the particles as the flushing liquor containing fine coal particles and agglomerates is conducted into the separation tank 4. The pressure seal prevents coal gases from the charging main 2 from entering the inlet tank 8.

APPARATUS

The apparatus of the present invention includes: the separation tank 4, an inlet means, a light particle separation means, an agglomerate outlet means 16, and a substantially clear liquor outlet means 18. The separation tank 4 receives flushing liquor having fine coal particles and agglomerates suspended therein. The light particle separation means may be a weir 6 disposed in a substantially horizontal plane in the separation tank 4. The weir 6 has an upper edge 20. The upper edge 20 is arranged at an elevation in the separation tank 4 which is slightly lower than the normal level 21 of flushing liquor (FIGS. 1 and 5) in the separation tank 4. The fine coal particles floating at or close to the surface of the flushing liquor in the separation tank 4 flow over the upper edge 20 of the weir 6 and out of the separation tank 4 via downcomer pipe 10.

The agglomerate outlet means 16 is disposed at the bottom of the separation tank 4 for conducting heavy agglomerates in the flushing liquor out of the separation tank 4. The flushing liquor at an intermediate elevation of the flushing liquor in the separation tank 4 becomes substantially clear, as a result of the floating of the fine coal particles toward the surface of the flushing liquor in the separation tank 4 and as a result of the sinking of heavy agglomerates toward the bottom of the flushing liquor in the separation tank 4. Outlet means 18 is disposed at an intermediate elevation in the separation tank 4 for conducting substantially clear flushing liquor out of separation tank 4.

Figure 2:
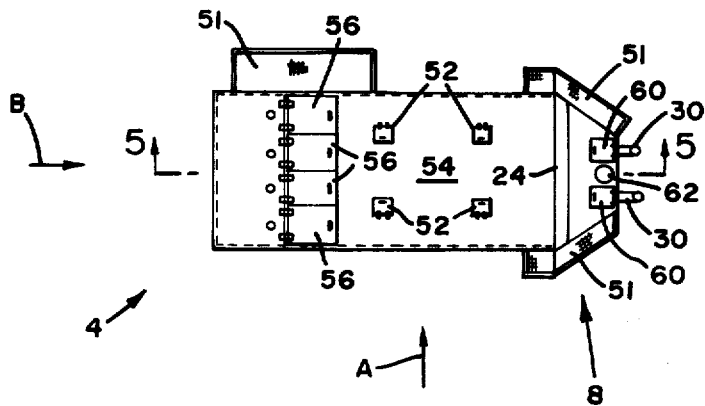
FIG. 2 is a top plan view of a portion of the apparatus of the present invention, showing a separation tank and inlet box.

The inlet means, such as the inlet tank 8, conducts flushing liquor containing fine coal particles and heavy agglomerates into the separation tank 4. The inlet tank 8 has an inclined bottom 22 connected to a portion of the separation tank 4. Referring to FIG. 2, the inlet tank 8 has an outlet 24 connected to the separation tank 4. The outlet 24 may be flared to facilitate movement of liquid and particles from the inlet tank 8 to the separation tank 4. Referring to FIG. 5, the inlet tank 8 further includes a screen means, such as a plurality of grids 26. The grids 26 are removably disposed in the inlet tank 8 and catch agglomerates, particles and lumps which are above a predetermined size, preventing them from flowing with the flushing liquor into the separation tank 4. The grids 26 may be cleaned periodically as part of a maintenance procedure. Referring to FIGS. 3 and 7, access to the grids 26 is provided by hinged doors 27 on the inlet tank 8.

Referring to FIG. 1, the apparatus further includes: a first conduit means, such as two inlet pipes 28 from each charging main 2, for conducting the flushing liquor containing solid particles (fine coal particles and agglomerates) from the charging main 2 (which functions as a liquid supply means) to the inlet tank 8 (which functions as an inlet means). Referring to FIGS. 2, 3 and 5, the inlet pipes 28 each have an output end 30 connected to the inlet tank 8. The output end 30 has a substantially U-shape with two upstanding legs. Each of the legs of the U-shape is arranged in a substantially vertical plane. One of the U-shaped legs is connected to the inlet tank 8 and extending into the inlet tank 8. The result of this arrangement is that a pressure seal is maintained as the flushing liquor and particles are conducted into the inlet tank 8 and into the separation tank 4; and the flushing liquor containing suspended particles is aerated as the flushing liquor and particles are conducted into the inlet tank 8 and into the separation tank 4.

The separation tank 4 includes: an upper portion 36 and a lower portion 38. The upper portion 36 has upper sides arranged in a substantially vertical plane. The lower portion 38 has lower sides convergently inclined with reference to the upper sides of the upper portion. The lower sides slope and converge at the agglomerate outlet means 16. Preferably, the shape of the upper portion 36 of the separation tank 4 is rectangular. Preferably, the angle of convergence relative to the horizontal plane of the lower portion 38 of the separation tank 4 is at least 60°.

Referring to FIGS. 3 and 5, the separation apparatus further includes a baffle 32 disposed in the separation tank 4 adjacent to the weir 6 and adjacent to the substantially clear liquor outlet means 18. The weir 6 is arranged in a substantially vertical plane. The baffle 32 has an upper edge 34 connected to a portion of the weir 6 and adjacent to the upper edge 20 of the weir 6. The baffle 32 is arranged in a plane which is inclined with reference to the weir 6. The weir 6 and the baffle 32 form a triangular partial enclosure. The substantially clear liquor outlet means 18 is arranged on an upper side of the separation tank in the partial enclosure formed by the weir 6 and the baffle 32. Referring to FIG. 6, the weir 6 is a substantially planar, rigid structural member extending across the width of the upper portion 36 of the separation tank 4 and having stiffening members 66. The baffle is similar to the weir 6 except that it is arranged at an incline.

The separation apparatus further includes: the downcomer pipe 10 arranged on the opposite side of the first weir 6 from the separation tank 4. The downcomer pipe 10 receives fine coal particles and flushing liquor which flow over the upper edge 20 of the weir 6. The fine coal particles and flushing liquor in the downcomer pipe 10 constitute a fine coal slurry. The fine coal slurry contains a comparatively higher concentration of the fine coal particles per volume of flushing liquor than the concentration of fine coal particles in the flushing liquor entering the separation tank.

The apparatus further includes a flotation cell means 12; a second conduit means 42; a pump means 44; a filter means 14; a froth conducting means 48 and a recycling means 50. The flotation cell means 12 may be a known apparatus which removes flushing liquor from the fine coal slurry and agglomerate slurry and thereby increases the concentration of solid particles (fine coal particles and agglomerates) in the fine coal slurry. The flotation cell means 12 has an output in the form of a fine coal and agglomerate froth or concentrate having a concentration, for example, of about 10% by weight of solid particles. The second conduit means 42 is arranged between the downcomer pipe 10 had the flotation cell means 12. The fine coal slurry from the downcomer pipe 10 and agglomerate slurry from the outlet means 16 are combined in the second conduit means 42 and conducted to the flotation cell means 12. The pump means 44 pumps fine coal slurry from the downcomer pipe 10 and agglomerate slurry from the outlet means 16 to the flotation cell means 12. The filter means 14 may be a known apparatus which separates solid particles (fine coal particles and agglomerates) from the froth produced by the flotation cell means 12. The froth conducting means 48 conducts the froth of fine coal particles and agglomerates from the flotation cell means 12 to the filter means 14. The recycling means 50, such as a conduit, recycles the fine coal particles and agglomerates from the filter means 14 in the form of a "filter cake" having a concentration, for example, of about 50% by weight of solid particles for reuse in a coke oven.

Referring to FIG. 2, the separation tank 4 may have catwalk platforms 51 and handrails at various points around the side of the separation tank 4 and the inlet tank 8. Referring to FIG. 2, the separation tank 4 has a plurality of inspection hatches 52 disposed in the roof 54 of the separation tank 4 to allow access from the roof 54 into the separation tank 4. Referring to FIGS. 2 and 3, the roof 54 of the separation tank 4 also has a plurality of hinged doors 56 located over the weir 6 and baffle 32 which allow access from the roof 54 of the separation tank 4 to the weir 6 and the baffle 32.

Referring to FIGS. 3 and 4, the separation tank 4 has a support structure consisting of a plurality of upright support members 58 arranged at the corners of the separation tank 4 and adjacent to the downcomer pipe 10. Referring to FIGS. 3, 5 and 7, the inlet tank 8 has a plurality of insepection hatches 60 and a vent 62 on the roof 54 of the inlet tank 8. Referring to FIG. 6, the weir 6 has a plurality of stiffening means 66.

Referring to FIG. 4, the separation tank has an overflow output 68, a backwash inlet 70, and a recycling means 72. The overflow output 68 is a means of removing an overflow of fine coal slurry in the downcomer pipe 10 if the level of fine coal slurry becomes too high. The backwash inlet 70 recycles a portion of the substantially clear liquor back into the downcomer pipe 10. Referring to FIG. 1, the substantially clear liquor removed from the separation tank 4 at the substantially clear liquor outlet means 18 is pumped through a third conduit means 78 by a pump means 74 to a strainer system 76. Most of the substantially clear liquor passes through the strainer system 76 and may then be sent via a fourth conduit means 80 to the charging main 2 for reuse. A portion of the substantially clear liquor is found to contain some suspended particles. These suspended particles are removed by the strainer means 76 and sent with a small portion of clear liquor (backwash) through a fifth conduit means 82 back to the downcomer pipe 10 where such suspended particles from the strainer means 76 enter the downcomer pipe 10 at the backwash inlet 70. The recycle means 72 provides a way of recycling some of the fine coal slurry back into the downcomer pipe 10 if the level in the downcomer pipe 10 becomes too low.

The liquor removed by the flotation cell means 12 contains heavy particles which are not floatable in the flotation cell means 12 and dissolved solids. Most of such liquor from the flotation cell means 12, the portion containing the lighter particles, is passed to the charging main 2. A smaller portion of the liquor, which contains the heavier particles, is passed to the collector main 83 by a step known as "blow-down". A liquor make-up supply means 90 provides a supply of flushing liquor or mill water for start-up of operation and to replace the liquor in system lost by "blow-down" to the collector main 83.

EXAMPLE

In a typical example, about 2,150 gallons per minute of flushing liquor are supplied to separation tank 4. The 2,150 gallons per minute of flushing liquor contain about 144 pounds per minute of solid particles, including both fine coal particles and agglomerates. The 144 pounds per minute of solid particles represents about 0.8 percent solid particles by weight in the flushing liquor.

$$\frac{144 \text{ lbs. per minute}}{2{,}150 \text{ gals. per min.} \times 8.3 \text{ lbs. per gal.}} = 0.8\%$$

Of the 144 pounds per minute entering the separation tank 4, about 121 pounds of solid particles are fine coal particles which float and about 23 pounds per minute are agglomerates which sink. Thus, about 84 percent of the solid (fine coal) particles float and about 16 percent of the solid (agglomerates) particles sink in the separation tank 4. The residence time in the separation tank 4 is about 10 minutes. The upper portion 36 of the separation tank 4 forms about 12 feet by 20 feet rectangle. The upper portion 36 has a depth of about 6 feet, not including the lower portion 38. The fine coal slurry leaving the separation tank 4 through the downcomer pipe 10 flows at the rate of about 350 gallons per minute and contains 4.1 percent fine coal particles by weight in the fine coal slurry.

$$\frac{121 \text{ lbs. per minute}}{350 \text{ gals. per min.} \times 8.3 \text{ lbs. per gal.}} = 4.1\%$$

The agglomerate slurry leaving the outlet means 16 flows at the rate of about 200 gallons per minute and contains 1.4 percent agglomerate particles by weight in the agglomerate slurry.

$$\frac{23 \text{ lbs. per minute}}{200 \text{ gals. per min.} \times 8.3 \text{ lbs. per gal.}} = 1.4\%$$

The combined fine coal and agglomerate slurry supplied to the flotation cell means 12 contains 2.5 percent solid by weight. The output from the flotation cell means 12 contains about 10 percent by weight of solid particles. The output from the filter means 14 in the form of a "filter cake" has a concentration of about 50 percent by weight of solids. The portion of the clear liquor with suspended particles flowing from the strainer means 76 through the fifth conduit 82 to the downcomer pipe 10 (backwash) flows at the rate of about 150 gallons per minute. The fine coal and agglomerate slurry entering the flotation cell means 12 flows at the rate of about 700 gallons per minute.

$$350 + 200 + 150 = 700 \text{ gallons per minute}$$

These 700 gallons per minute represent the total flow of the fine coal slurry, agglomerate slurry and the backwash. The 700 gallons per minute contain most or all of the 144 lbs. per minute of solid particles which entered the separation tank 4. About 700 gallons of liquor are removed from the flotation cell means 12. About 350 gallons per minute are sent to each of two batteries via a sixth conduit means 84. About 300 gallons per minute, containing lighter particles, are sent to each of the charging main 2 via a seventh conduit means 86. About 50 gallons per minute, containing the heavier particles, are sent to each collecting main 83 for a total of 100 gallons per minute.

We claim:

1. An apparatus for separating solid particles suspended in a liquid, said solid particles including a light particle portion which tends to float at or close to the surface of the liquid and a heavy particle portion which tends to sink to the bottom of the liquid, said separation apparatus comprising:
   a separation tank for receiving said liquid and said suspended solid particles;
   inlet means for conducting said liquid into said separator tank;
   conduit means for conducting said liquid containing solid particles into said inlet means, said conduit means having an output end connected to said inlet means, said output end of said conduit means having a substantially U-shape with two upstanding legs, each of said legs of said U-shape arranged in a substantially vertical plane, one of said legs connected to said inlet means and extending into said inlet means;
   screening means arranged in the bottom of said inlet means through which said liquid containing said solid particles flow from said inlet means into said separation tank;
   a weir disposed in said separation tank, said weir having an upper edge, said upper edge arranged at an elevation in said separation tank which is slightly lower than a normal level of the liquid in said separation tank to permit said light particles to flow over said weir and out of said separation tank;
   outlet means disposed at the bottom of said separation tank to permit the heavy particles in said liquid which sink toward the bottom of the liquid in said separation tank to flow out of said separation tank; and
   outlet means disposed at an intermediate elevation in said separation tank for conducting substantially clear liquid out of said separation tank.

2. The separation apparatus of claim 1 wherein the inlet means for conducting said liquid containing said solid particles into said separation tank has an inclined bottom connected to a portion of said separation tank for conducting said liquid from said inlet means to said separation tank.

3. The separation apparatus of claim 1 further comprising:
   baffle means disposed in said separation tank adjacent to said weir and adjacent to said substantially clear liquid outlet means, said weir arranged in a substantially vertical plane, said baffle means having an upper edge connected to a portion of said weir, said baffle means arranged in a plane which is inclined with reference to said weir, said weir and said baffle means forming an enclosure for said substantially clear liquid outlet means.

4. The separation apparatus of claiim 1 wherein the upper portion of said separation apparatus has upper sides arranged in a substantially vertical plane and the lower portion having lower sides arranged in planes inclined to said vertical plane, said lower sides converging at said heavy particle outlet means.

5. The apparatus of claim 4 wherein said liquid is a flushing liquor from a charging main of the coke oven battery, said light particles are fine coal particles suspended in a flushing liquor and said heavy particles are agglomerates suspended in said flushing liquor.

6. The separation apparatus of claim 5 further comprising:
   a downcomer pipe arranged on the opposite side of said weir from said separation tank, said pipe receiving said fine coal particles and flushing liquor which flow over the upper edge of said weir; and
   flotation means communicating with said downcomer pipe for concentrating said fine coal particles and agglomerates in said liquid into a fine coal and agglomerate concentrate, said flotation means having an output of said fine coal and agglomerate concentrate.

7. The apparatus of claim 6 further comprising: filter means for separating fine coal particles and agglomerates from said fine coal and agglomerate concentrate; conduit means for conducting said fine coal particle and agglomerate concentrate from said flotation means to said filter means; and means for removing said fine coal particles and agglomerates from said filter means.

8. A solid-liquid separation apparatus for use in conjunction with a coke oven battery in which coal is converted to coke, said separation apparatus separating suspended solid particles from a flushing liquor from a charging main of said coke oven battery, said solid particles suspended in said liquor comprising a fine coal portion which tends to float at or close to the surface of said liquor and an agglomerate portion which tends to sink to the bottom of said liquor, said separation apparatus comprising:
- a separation tank for receiving said liquor and said suspended solid particles comprising an upper portion having upper sides arranged in a substantially vertical plane and the lower portion having lower sides arranged in planes inclined to said vertical plane, said lower sides converging at said heavy particle outlet means;
- a fine coal particle separation means comprising a weir disposed in said separation tank, said weir having an upper edge, said upper edge arranged at an elevation in said separation tank which is slightly lower than a normal level of said liquor in said separation tank, said fine coal particle portion floating at or close to the surface of said liquor in said separation tank, said fine coal particle portion flowing over said weir and into a downcomer pipe;
- outlet means disposed at the bottom of said separation tank to permit the agglomerate portion of said particles in said liquor which sink toward the bottom of the liquor in said separation tank to flow out of said separation tank;
- outlet means disposed at an intermediate elevation in said separation tank for conducting substantially clear liquor out of said separation tank;
- inlet means for conducting said liquor containing said suspended solid particles into said separation tank, said inlet means having an inclined bottom connected to a portion of said separation tank;
- conduit means for conducting said liquor containing solid particles into said inlet means, said conduit means having an output end connected to said inlet means, said output end of said conduit means haing a substantially U-shape with two upstanding legs, each of said legs of said U-shape arranged in a substantially vertical plane, one of said legs connected to said inlet means and extending into said inlet means;
- screening means arranged in the bottom of said inlet means through which said liquor containing said solid particles flow from said inlet means into said separation tank;
- baffle means disposed in said separation tank adjacent to said weir and adjacent to said substantially clear liquid outlet means, said weir arranged in a substantially vertical plane, said baffle means having an upper edge connected to a portion of said weir, said baffle means arranged in a plane which is inclined with reference to said weir, said weir and said baffle means forming an enclosure for said substantially clear liquid outlet means;
- a downcomer pipe arranged on the opposite side of said weir from said separation tank, said pipe receiving said fine coal particle portion and flushing liquor which flow over said upper edge of said weir;
- flotation means communicating with said downcomer pipe and with said agglomerate outlet means for concentrating said fine coal particle and agglomerates, said flotation means having an output for said fine coal and agglomerate concentrate;
- filter means for separating fine coal particles and agglomerates from said fine coal and agglomerates concentrate;
- conduit means for conducting said fine coal and agglomerate concentrate from said flotation means to said filter means; and
- recycle means for conducting said fine coal particles from said filter means to said coke oven battery.

* * * * *